US008459386B2

(12) United States Patent
Pickholz

(10) Patent No.: US 8,459,386 B2
(45) Date of Patent: Jun. 11, 2013

(54) ROAD WHEEL PROPULSION APPARATUS AND METHOD OF MAKING

(75) Inventor: Michael Frederick Pickholz, Oxford, MI (US)

(73) Assignee: MaterialWerks LLC, Oxford, MI (US)

( * ) Notice: Subject to any disclaimer, the term of this patent is extended or adjusted under 35 U.S.C. 154(b) by 392 days.

(21) Appl. No.: 12/600,604

(22) PCT Filed: May 16, 2008

(86) PCT No.: PCT/US2008/063904
§ 371 (c)(1),
(2), (4) Date: Nov. 17, 2009

(87) PCT Pub. No.: WO2008/144517
PCT Pub. Date: Nov. 27, 2008

(65) Prior Publication Data
US 2010/0163323 A1    Jul. 1, 2010

Related U.S. Application Data

(60) Provisional application No. 61/004,813, filed on Nov. 30, 2007, provisional application No. 60/938,709, filed on May 18, 2007.

(51) Int. Cl.
*B60K 1/00* (2006.01)
(52) U.S. Cl.
USPC .................. 180/65.51; 180/65.6; 180/65.31
(58) Field of Classification Search
USPC .............. 180/65.51, 5.514, 65.6, 65.5, 5.52, 180/65.31; 310/266, 156.26, 67 R, 216.004
See application file for complete search history.

(56) References Cited

U.S. PATENT DOCUMENTS

| 638,643 A | 12/1899 | Newman et al. |
| 643,854 A | 2/1900 | Whittlesey |
| 754,802 A | 3/1904 | Porsche et al. |
| 907,715 A | 10/1905 | Gill |
| 1,270,421 A | 6/1918 | Kingsbury |
| 1,509,737 A | 9/1924 | McCleary |
| 1,515,076 A | 11/1924 | Schurch |
| 1,709,255 A | 4/1929 | Fielder |
| 1,747,560 A | 2/1930 | Weathers |
| 1,792,525 A | 2/1931 | Apple |
| 1,997,974 A | 4/1935 | Moore et al. |
| 2,258,328 A | 10/1941 | Lee et al. |
| 2,335,398 A | 11/1943 | Downey |

(Continued)

FOREIGN PATENT DOCUMENTS

| DE | 103 38 659 A1 | 3/2005 |
| JP | 2005104222 | 4/2005 |
| SU | 1992700946 | 8/1992 |
| WO | 00/32462 | 6/2000 |

*Primary Examiner* — Hau Phan
(74) *Attorney, Agent, or Firm* — Reising Ethington P.C.

(57) ABSTRACT

A road wheel propulsion apparatus for alternately propelling and retarding the rotation of a road wheel supporting an automotive vehicle. An electric drive motor is carried by a vehicle and is drivingly connected to a road wheel to provide motive force to the vehicle by driving the road wheel in rotation relative to the vehicle. The electric drive motor includes a radially inner motor stator to be fixed to a vehicle. The electric drive motor also includes a radially outer annular motor rotor to be carried within a road wheel and to be driven in rotation relative to the motor stator by electromagnetic forces developed by between the motor stator and the motor rotor.

34 Claims, 6 Drawing Sheets

U.S. PATENT DOCUMENTS

| | | |
|---|---|---|
| 2,348,053 A | 5/1944 | Bowker |
| 2,506,146 A | 5/1950 | Gladish |
| 2,514,460 A | 7/1950 | Tucker |
| 2,581,551 A | 1/1952 | Myrmirides |
| 2,608,598 A | 8/1952 | Hawkins et al. |
| 2,899,005 A | 8/1959 | Speicher |
| 3,055,448 A | 9/1962 | Fagel |
| 3,090,456 A | 5/1963 | Blenkle |
| 3,495,689 A | 2/1970 | Peach |
| 3,548,965 A | 12/1970 | Pierro |
| 3,566,165 A | 2/1971 | Lohr |
| 3,581,173 A | 5/1971 | Hood et al. |
| 3,586,132 A | 6/1971 | Tantlinger |
| 3,704,759 A | 12/1972 | Vitkov et al. |
| 3,792,742 A | 2/1974 | Mager |
| 3,812,928 A | 5/1974 | Rockwell et al. |
| 3,892,300 A | 7/1975 | Hapeman et al. |
| 3,897,843 A | 8/1975 | Hapeman et al. |
| 4,021,690 A | 5/1977 | Burton |
| 4,330,045 A | 5/1982 | Myers |
| 4,346,777 A | 8/1982 | Restelli |
| 4,365,187 A | 12/1982 | McDaniel et al. |
| 4,389,586 A | 6/1983 | Foster et al. |
| 4,471,250 A | 9/1984 | Snider |
| 4,546,422 A | 10/1985 | Okado |
| 4,723,832 A | 2/1988 | Okazato et al. |
| 4,763,981 A | 8/1988 | Wilkins |
| 4,895,426 A | 1/1990 | Pinson |
| 4,896,939 A | 1/1990 | O'Brien |
| 4,913,258 A | 4/1990 | Sakurai et al. |
| 4,918,365 A | 4/1990 | Tanuma et al. |
| 4,952,012 A | 8/1990 | Stamnitz |
| 5,042,903 A | 8/1991 | Jabukowski |
| 5,049,769 A | 9/1991 | Reinhardt et al. |
| 5,146,528 A | 9/1992 | Gleim et al. |
| 5,150,442 A | 9/1992 | Desmons |
| 5,164,623 A | 11/1992 | Shkondin |
| 5,327,034 A | 7/1994 | Couture et al. |
| 5,355,039 A | 10/1994 | Couture |
| 5,412,269 A | 5/1995 | Couture |
| 5,796,192 A | 8/1998 | Riepl |
| 6,703,742 B1 | 3/2004 | Brandley et al. |
| 7,049,725 B2 | 5/2006 | Blouin et al. |
| 7,059,437 B2 * | 6/2006 | Heinen ............ 180/65.51 |
| 7,347,427 B2 * | 3/2008 | Heinen ............ 280/5.514 |
| 7,533,747 B2 * | 5/2009 | Heinen ............ 180/65.51 |
| 7,579,738 B2 * | 8/2009 | Cros et al. ......... 310/216.004 |
| 7,671,509 B2 * | 3/2010 | Scott et al. ......... 310/266 |
| 7,679,210 B2 * | 3/2010 | Zhu ............... 290/55 |
| 8,002,060 B2 * | 8/2011 | Komatsu ............ 180/65.51 |
| 2005/0247496 A1 | 11/2005 | Nagaya |

\* cited by examiner

ROAD WHEEL PROPULSION APPARATUS AND METHOD OF MAKING

TECHNICAL FIELD

This invention relates generally to a road wheel propulsion apparatus for alternately propelling and retarding the rotation of road wheels supporting an automotive vehicle, and more specifically, to such a road wheel driven by an electric motor disposed within the wheel.

BACKGROUND OF THE INVENTION

It is known for a road wheels to be driven by "in-wheel" electric motors supported coaxially within such wheels and for such wheels to be retarded in their rotation by a braking system. It is also known for "in-wheel" electric motors to be arranged to provide a regenerative braking effect that simultaneously retards wheel rotation and charges a vehicle battery.

What is needed is an in-wheel electric motor that provides propulsion and regenerative braking without a myriad of attendant design problems associated with such systems, as they are currently known in the art.

SUMMARY OF THE INVENTION

A road wheel propulsion apparatus is provided for alternately propelling and retarding the rotation of a road wheel supporting an automotive vehicle. The apparatus comprises an electric drive motor configured to be carried by a vehicle and drivingly connected to a road wheel to provide motive force to the vehicle by driving the road wheel in rotation relative to the vehicle. The electric drive motor comprises a radially inner motor stator configured to be fixed to a vehicle, and a radially outer annular motor rotor configured to be carried within a road wheel and to be driven in rotation relative to the motor stator by electromagnetic forces developed by between the motor stator and the motor rotor.

Alternatively, the motor may be configured to generate electricity while generating braking force retarding the rotational speed of a wheel the motor is mounted in, relative to a vehicle the wheel is mounted on.

Alternatively, the motor rotor may be configured to carry a hubless road wheel.

Alternatively, the apparatus may include a hub that carries the motor stator and is configured to mount to a vehicle component, and a spindle that carries the motor rotor and is received within the hub and supported by the hub for rotation relative to the hub.

Alternatively, the motor rotor may include a motor rotor housing carried by the spindle and configured to carry a hubless wheel.

Alternatively, the hub may be removably mounted to any one or more vehicle components selected from the group of components consisting of a steering knuckle, a strut knuckle, a suspension hub carrier, and a suspension axle.

Alternatively, the motor stator may include an annular motor stator windings support frame carried by the hub and carrying stator windings of the motor stator.

Alternatively, the stator windings support frame may include a radially oriented array of scallops configured to provide clearance for vehicle components while supporting stator windings of axial width greater than an axial length of the hub.

Alternatively, the array of scallops may be supported within a stator winding support drum such that each scallop of the array is connected at a radially outer end to the drum and at a radially inner end to the hub, and the array of scallops is be shaped to provide clearance for vehicle components while supporting stator windings of axial width greater than an axial length of the hub.

Alternatively, the scallops of the array of scallops may be shaped to be more axially extensive where their respective outer ends connect to the drum and less axially extensive where their respective inner ends connect to the hub.

Alternatively, the motor may include a motor chamber that at least partially encloses the stator windings.

Alternatively, the hub may at least partially define a non-rotating pathway between the motor chamber and a vehicle carrying the apparatus, the pathway being configured to allow for the passage of any one or more of a number of different things selected from the group consisting of electricity, matter, electrical wiring, an electrical wiring conduit, a coolant fluid, a coolant gas, an inert gas, a coolant conduit, and an inert gas conduit.

Alternatively, the motor rotor may include a hubless road wheel configured to be removably mounted on the motor rotor and having a radially inner annular rim surface, and the motor rotor may include a complementary annular projection surface on a concentric projection extending outboard from the motor rotor housing, the annular projection surface of the motor rotor housing being configured to engage the annular inner rim surface of the wheel when the wheel is mounted onto the motor rotor housing, the respective annular surfaces being shaped to removably urge the wheel toward concentricity in relation to the motor rotor as the wheel is mounted on the motor rotor.

Alternatively, the radially inner annular rim surface of the wheel and the annular projection surface of the motor rotor may each be generally frustoconical in shape.

Alternatively, the apparatus may include a hubless road wheel configured to be removably mounted on the motor rotor, and a virtual wheel center configured to be removably and concentrically connected to the wheel and to removably mount the wheel on a standard vehicle wheel mounting flange.

Alternatively, the apparatus may include a hubless road wheel configured to be removably mounted on the motor rotor, and a service wheel center configured to be removably and concentrically connected to the wheel and to removably mount the wheel on conventional wheel servicing equipment, the service wheel center further comprising an axially disposed wheel pilot bore configured to be received on a spindle of a wheel mount of conventional servicing equipment.

Alternatively, the service wheel center comprises mounting lug holes positioned to receive mounting fasteners configured to mount the service wheel center to a standard vehicle wheel mounting flange.

Alternatively, the apparatus may include an inner rotating shield carried by the motor rotor, the inner rotating shield having a radially outer rim carried by and sealed against the motor rotor and a bearing seal carried by a radially inner rim of the shield positioned to bear and seal against one of a stationary vehicle component and the hub.

Alternatively, the inner rotating shield may be configured to provide structural support for an inboard portion of the motor rotor.

Alternatively, the apparatus may include a fluid passageway extending through the hub and configured to provide fluid communication between the motor chamber and an ambient air mass.

Alternatively, an inert gas, such as Nitrogen, may occupy the motor chamber.

Alternatively, the inert gas in the motor chamber may be pressurized to a value greater than ambient air pressure.

Alternatively, the apparatus may include a remote inert gas reservoir and the fluid passageway may provide fluid communication between the motor chamber and the remote inert gas reservoir.

Alternatively, the apparatus may include a gas pressure sensor disposed in a position to sense gas pressure within the motor chamber.

Alternatively, the sensor may be configured to provide a corresponding indication to a vehicle operator when the sensor detects a reduction in gas pressure within the motor chamber.

Alternatively, the sensor may be configured to provide a corresponding indication to an on board vehicle diagnostics system when the sensor detects a reduction in gas pressure within the motor chamber.

Alternatively, a disk braking system may be supported adjacent the electric drive motor and may be actuable to retard wheel rotational velocity relative to the vehicle. Such disk braking system may include a caliper configured to be carried by the vehicle in a position axially inboard of the stator windings; and an annular disk brake rotor carried coaxially by the motor rotor in a position to be received by the caliper when the electric drive motor and the caliper are mounted on the vehicle.

Alternatively, the disk brake rotor may be supported on the motor rotor by a plurality of mounts spaced circumferentially around a periphery of the disk brake rotor and configured to allow relative radial motion while constraining relative rotational motion between the disk brake rotor and the motor rotor.

Alternatively, each mount of the plurality of mounts may include a motor rotor post extending axially inboard from the motor rotor, and a brake rotor mating recess formed radially inwardly from a peripheral outer edge of the disk brake rotor, each such recess being positioned and shaped to receive and loosely engage one of the motor rotor posts.

Alternatively, the spindle may be configured to be drivably connectable to a mechanical drive component of a mechanical drive train carried by the vehicle and to transmit driving torque from an engine of the mechanical drive train through the motor rotor to the wheel.

In addition, a method is provided for assembling a road wheel propulsion apparatus. The method may comprise the steps of providing an electric motor rotor, providing an electric motor stator configured to be fixed to a vehicle, supporting the motor stator within the motor rotor, and supporting a hubless wheel on the motor rotor.

Alternatively, the step of providing an electric motor rotor may include providing a motor rotor comprising a motor rotor housing configured to both carry the hubless wheel and to support the motor rotor for rotation on a hub mounted to a vehicle structure, and fabricating the motor rotor housing a spin-formed forging process.

Alternatively, the step of providing an electric motor stator may include providing a hub configured to mount the motor stator to a vehicle suspension, and the step of providing and supporting a motor stator windings support frame may include insert molding the hub onto the motor stator windings support frame.

BRIEF DESCRIPTION OF THE DRAWINGS

These and other features and advantages of the invention will become apparent to those skilled in the art in connection with the following detailed description, drawings, photographs, and appendices, in which.

DETAILED DESCRIPTION OF INVENTION EMBODIMENT(S)

Figure 1:
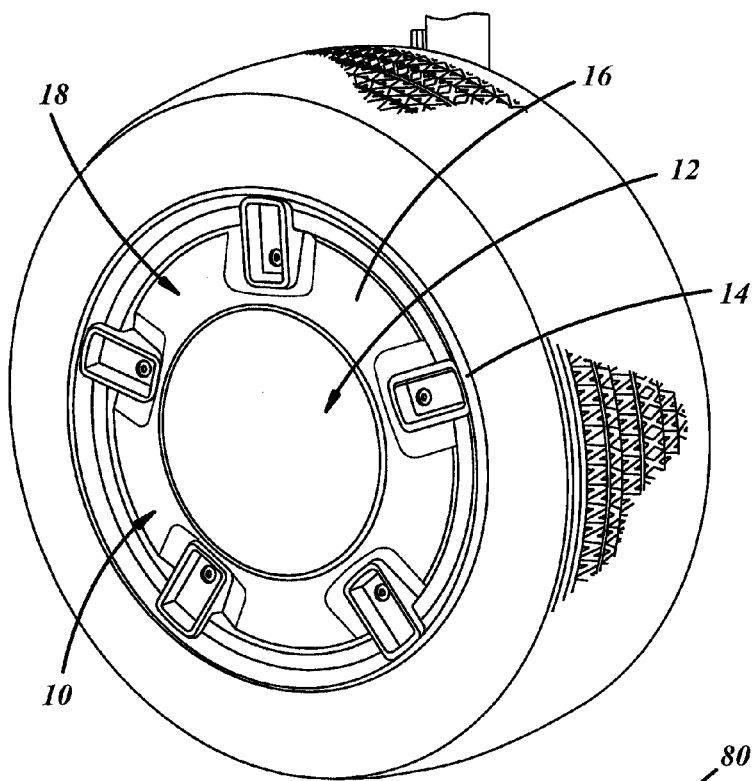
FIG. 1 is an outside orthogonal view of a tire mounted on a road wheel propulsion apparatus constructed according to the invention and mounted on a knuckle of an automotive vehicle.
Figure 2:
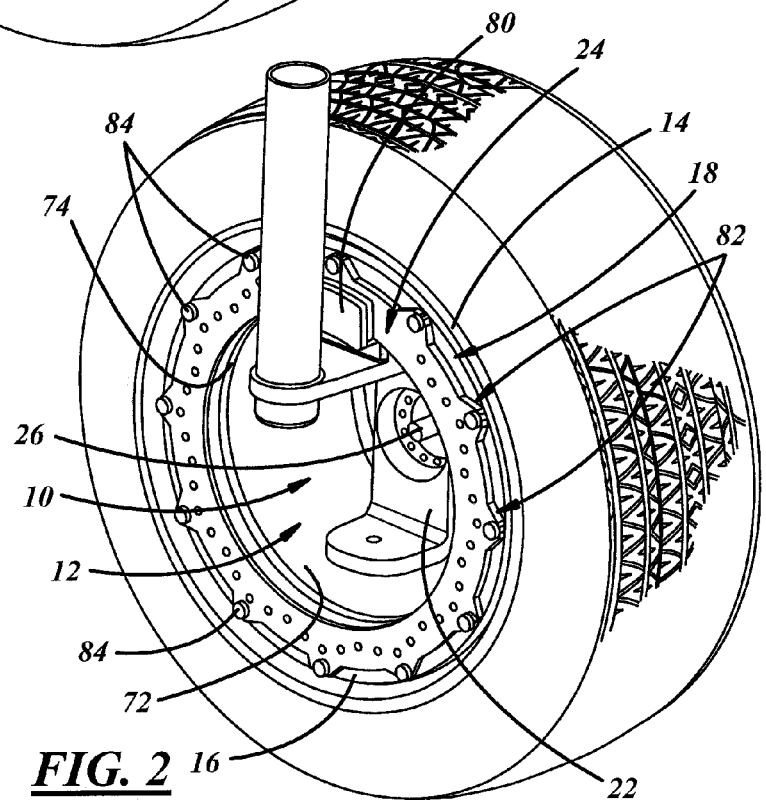
FIG. 2 is an inside orthogonal view of the tire, road wheel propulsion apparatus, and knuckle of FIG. 1.
Figure 3:
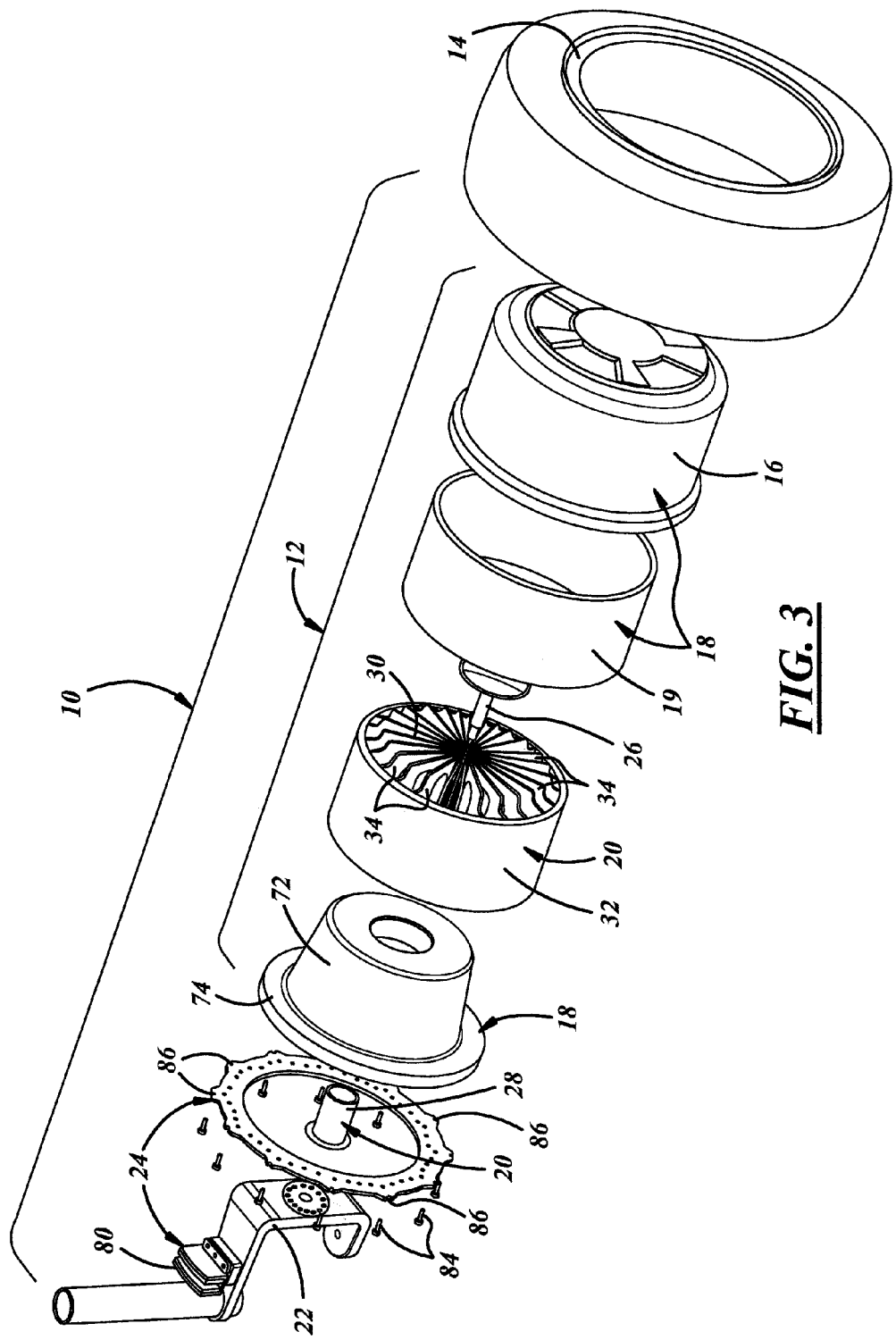
FIG. 3 is an exploded orthogonal view of the tire, road wheel propulsion apparatus, and knuckle of FIG. 1.
Figure 4:
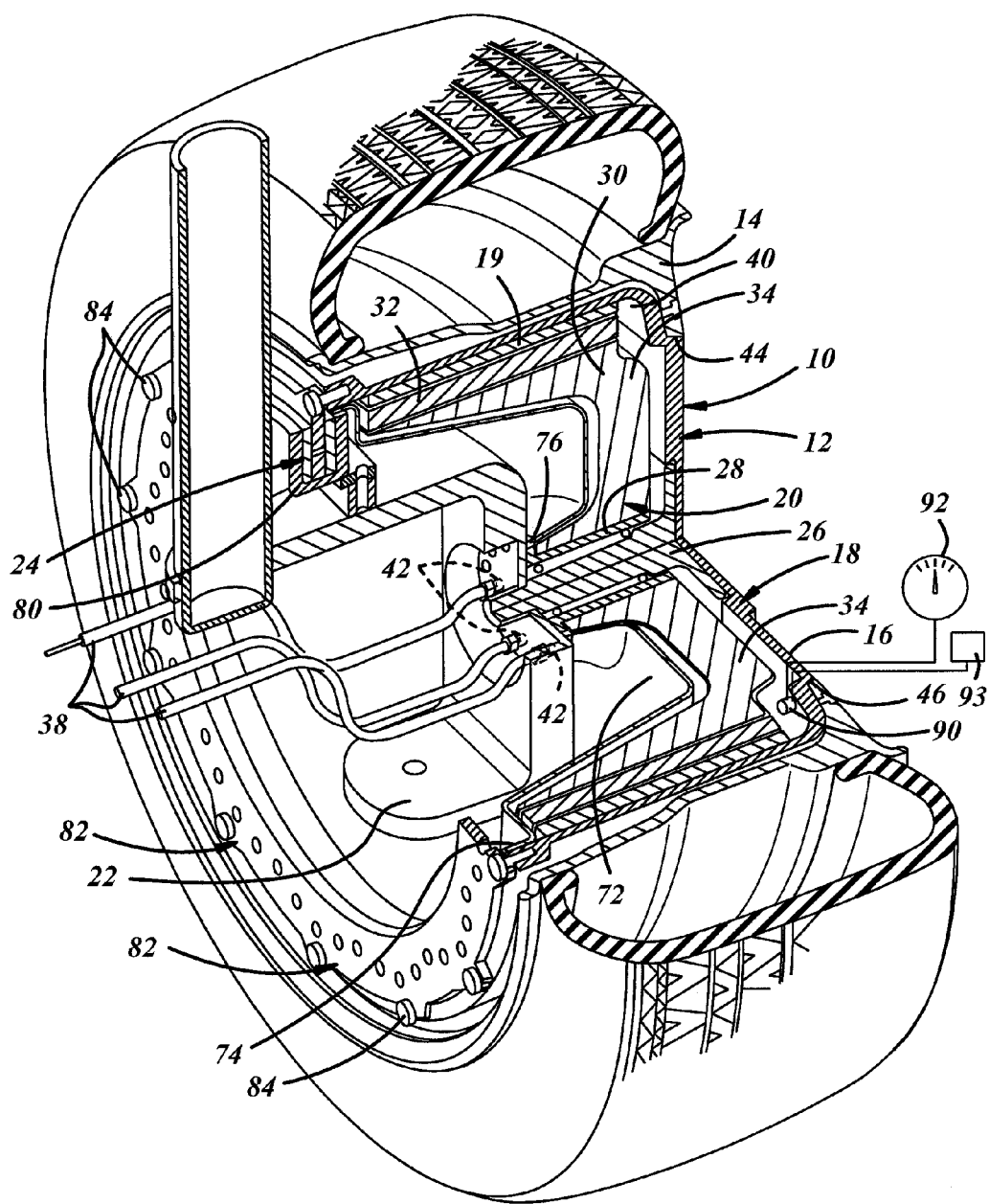
FIG. 4 is a partially cut-away inside orthogonal view of the tire, road wheel propulsion apparatus, and knuckle of FIG. 1.
Figure 6:
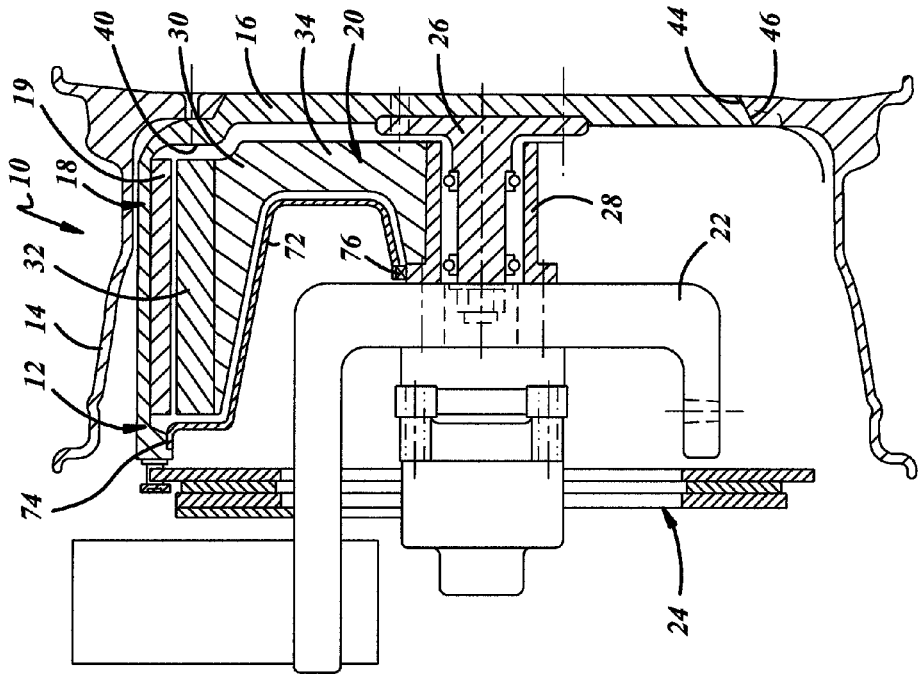
FIG. 6 is a front partial cross-sectional view of the road wheel propulsion apparatus and knuckle of FIG. 1.
Figure 5:
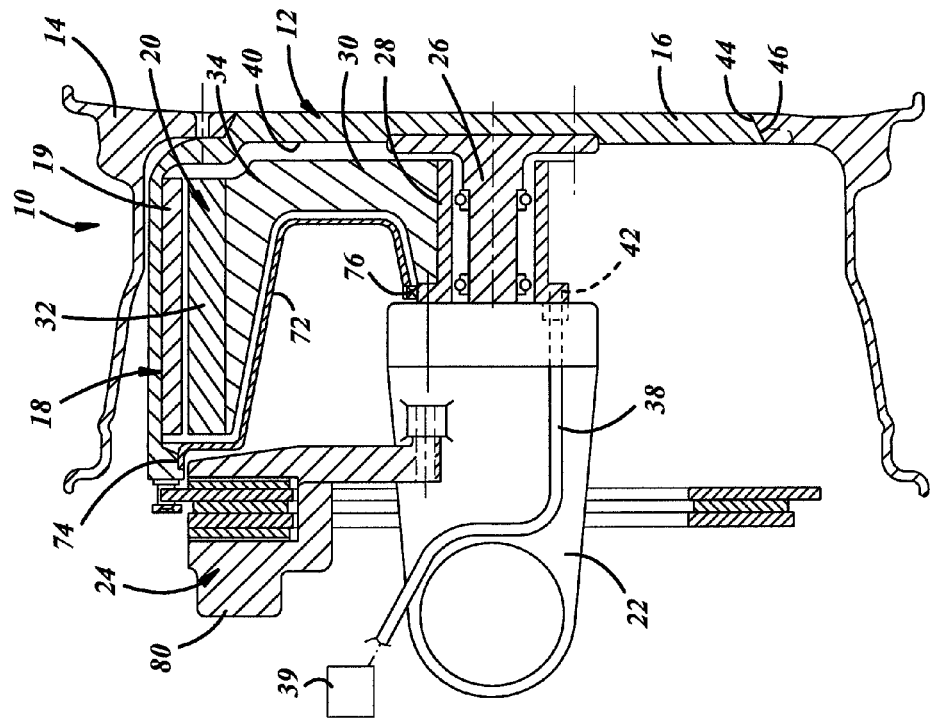
FIG. 5 is a top partial cross-sectional view of the road wheel propulsion apparatus and knuckle of FIG. 1.
Figure 7:
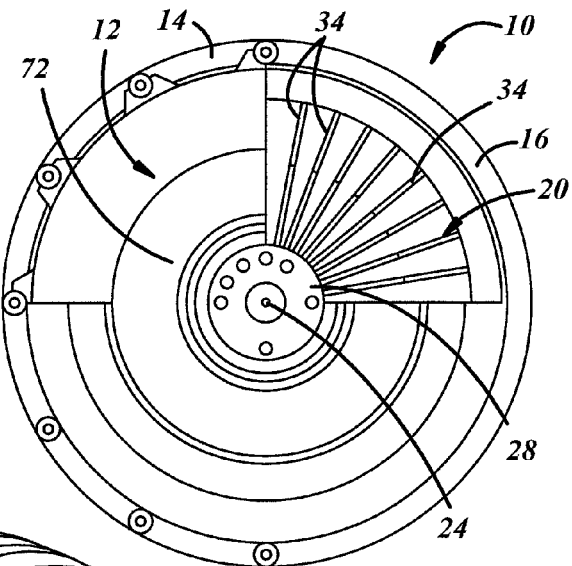
FIG. 7 is an inside partial cut-away view of the road wheel propulsion apparatus of FIG. 1.

A road wheel propulsion apparatus for alternately propelling and retarding the rotation of a road wheel supporting an automotive vehicle is generally shown at 10 in FIGS. 1-7. A second embodiment is generally indicated at 10' in FIGS. 10 and 11. Reference numerals with the designation prime (') in FIGS. 10 and 11 indicate alternative configurations of elements that also appear in the first embodiment. Unless indicated otherwise, where a portion of the following description uses a reference numeral to refer to the figures, I/we intend that portion of the description to apply equally to elements designated by primed numerals in FIGS. 10 and 11.

The apparatus 10 includes an electric drive motor 12 supported within a motor vehicle wheel 14 and is actuable to drive the road wheel 14 in rotation relative to the vehicle. The electric drive motor 12 may also be capable of regenerative braking, i.e., concurrently generating electricity, and generating braking force retarding the rotational speed of the road wheel 14 relative to the vehicle. A radially outer annular motor rotor housing 16 of a motor rotor 18 of the electric drive motor 12 is connected to the road wheel 14. The motor rotor 18 also includes rotor windings or a drum-shaped permanent magnet 19 arrangement. A radially inner motor stator 20 of the electric drive motor 12 including central elements such as a shaft of the motor 12 may be fixed to a vehicle structure such as a strut or steering knuckle 22 or other suitable vehicle suspension component. A disk braking system 24 may be supported adjacent the motor 12 and is actuable to retard road wheel rotational velocity relative to the vehicle. The road wheel may be a hub-less road wheel 14 that may be removably supported on the electric drive motor rotor 18. The hub-less wheel 14 may be directly mounted to the motor rotor 18 near a circumferential periphery of the motor rotor 18. This arrangement provides as short a torque path as possible and allows for the road wheel 14 to have a lower mass design. The motor's torque path is the path by which drive torque as well as regenerative braking retardation torque must travel from the point the torque is being generated to the point where it is being applied. A short torque path inherently translates into an efficient, lightweight design because a short torque path minimizes the quantity and strength of material required to transfer the driving/retarding torques generated by an in-wheel motor 12 from the motor 12 to a wheel/tire interface.

The electric motor rotor 18 may include the motor rotor housing 16, which may be carried by a spindle 26 and configured to carry a hubless road wheel 14. In other words, the motor rotor housing 16 may both carry the hubless road wheel 14 and support the motor rotor 18 on the spindle 26 that's received for rotation in a hub 28 mounted to a vehicle structure. More specifically, the motor rotor housing 16 may be connected to or integrally formed with the spindle 26, which is rotatably supported by the hub 28. The hub 28 may be an automotive type wheel hub that's suitable to rotatably support the spindle 26 on appropriate high-speed wheel bearings. The spindle 26 may comprise high-strength metal and the wheel bearings may be ball bearings, taper bearings and/or other commonly available automotive wheel bearing devices.

The motor rotor housing 16 may comprise a light alloy casting, a forging, or stampings, and may be spin-formed or formed by a combination of technologies such as part casting/spin-forming, combining elements of both manufacturing techniques. The motor housing 16 rotor may be concentrically mounted to the spindle 26 to insure proper retention as well as concentricity of the assembly. More specifically, the motor rotor housing 16 may be formed by spin-formed casting around the spindle 26 to insure that the housing is more precisely concentrically formed about a rotational axis of the spindle 26.

An annular light alloy stator windings support frame 30 may be carried by the spindle hub 28 and arranged to carry and enclose and to serve as a solid, lightweight structural support for stator windings 32 of the electric motor stator 20. The stator winding support frame 30 may also incorporate additional metallic elements within its structure, such as copper, copper alloys, and the like, to improve the efficiency of the motor 12. The stator windings support frame 30 may further be constructed to provide sufficient structural strength to bear wheel/motor 12 bearing loads. The stator windings support frame 30 may be shaped to provide both a rigid, lightweight structure, and clearance for the various suspension and steering components that are required to implement a functional, modern, suspension and, whenever applicable, to accommodate a steering system. More specifically, the stator windings support frame 30 may include a radially oriented array of scallops 34 arrayed and supported within the stator windings 32 such that each scallop 34 is connected at a radially outer end to the windings 32 or a drum-shaped structure supporting the windings, and at a radially inner end to the hub 28. The scallops 34 are shaped to provide clearance for vehicle suspension and/or steering components while supporting stator windings 32 of axial width greater than an axial length of the hub 28. More specifically, the scallops 34 are shaped to be more axially extensive where their respective outer ends support the windings 32 and less axially extensive where their respective inner ends connect to the hub 28. This arrangement allows the stator windings 32 to extend an axial width much greater than the axial length of the hub 28, thus providing both static and dynamic clearance for vehicle suspension and steering components that extend axially outward toward the hub 28 while at the same time providing sufficient structural rigidity to support the stator windings 32 of extensive axial width exceeding the axial length of the hub 28, e.g. approximating the width of the road wheel 14. In other words, a much larger motor 12 is thus packageable while fully retaining desired suspension/steering geometry. For example, because of its scalloped configuration, the frame 30 can be shaped to allow suspension/steering pivot points to be positioned in such a way as to provide a desirably small scrub radius (the scrub radius being the distance measured at the ground plane—separating the suspension pivot point (projected to the ground) and the wheel/tire center line (again, projected to the ground)). The significance of this is that a large deviation from a zero (0) scrub radius results in excessive road load inputs to the steering system as well as excessive loading conditions upon the suspension system as a whole. This approach provides for the harmonization of the functions associated with proper motor, suspension and steering operation. In addition, the scalloped design allows a rotor 36 of the disk braking system 24 to be disposed further inboard, adjacent and/or inboard of an inner surface of an inner rim of the road wheel 14, without having to resort to the use of an extension bracket or other such structure.

The spindle hub 28 may be removably mountable to a strut or steering knuckle 22, a suspension hub carrier, a suspension axle or equivalent vehicle suspension component or other suitable vehicle component via a circumferential array of fasteners or any other suitable means known in the art. The spindle hub 28 is designed for ease of manufacturing, simplicity, and is lightweight, and provides a straightforward means of mounting the spindle hub 28 to the knuckle/spindle carrier of a vehicle. The spindle hub 28 may be of conventional construction as is practiced in the automotive art and may include a robust mounting configuration comprising multiple attachment points. The hub 28 may be removably affixed to a knuckle 22 via fasteners arranged radially about the center of the hub's structure through a circumferential flange of the spindle hub 28. This fastener arrangement provides for straightforward mounting and dismounting of the entire apparatus 10 as a single assembly and insures a robust, stable construction that precisely maintains a gap between stator and rotor under all foreseeable operating conditions. It also provides a practical connection strategy/path for fitting or routing electrical, coolant and venting lines 38 (as required) to a generally toroidal interior motor chamber 40 or cavity of the motor 12. Electrical and/or fluid passageways 38 for carrying electricity, fluids such as coolant fluids, or gases such as inert gases (venting/gas lines), whether they be independent from one another or combined, may include electrical, venting, and/or fluid or gas lines routed via a protected environment; e.g., along the mechanical structure of the steering knuckle 22, the strut, the suspension, etc.; to provide a significantly more robust design than if such critical items, e.g., a 600 volt electric feed line, were allowed to dangle in mid-air and be vulnerable to damage, e.g., a tire blow-out that could easily rip unprotected cables to shreds. One of the passageways 38 may be or may include a dedicated venting tube extending from the motor stator 20 through the spindle hub 28 and the knuckle/spindle carrier to a suitable venting point to provide fluid communication between the interior chamber or cavity of the motor 12 (which is sealed by the inner rotating shield 72) and the ambient air mass. Alternatively, venting may be achieved by adapting either electrical conduits or coolant connection hoses to serve a venting function. Alternatively a passageway 38 such as a conduit or hose may be utilized to connect the inner motor chamber with a remote pressurized inert gas reservoir 39. In other words, the apparatus may include a remote inert gas reservoir 39 and the fluid passageways 38 may include a venting tube connected to the remote inert gas reservoir 39 and providing fluid communication between the motor chamber and the remote inert gas reservoir 39.

The spindle hub 28 may at least partially define one or more non-rotating pathways 42 between the motor chamber 40 and the knuckle 22 for the passage of electricity, matter, electrical wiring, an electrical wiring conduit, a coolant fluid, a coolant gas, an inert gas, a coolant conduit, and an inert gas conduit. The configurations of the spindle 26 and the spindle hub 28, while straightforward in nature, provide for a solid, sealed, non-rotating interface between the motor structure and a knuckle 22 of a vehicle to which the apparatus 10 is mounted. This provides for passage of whatever conduits or cables 38 the apparatus 10 requires. This interface configuration has the added benefits of allowing sensitive components to be enclosed in a protected environment and, at the same time, providing a minimal path length for the components, resulting in a robust, low mass arrangement.

The road wheel 14 may include a concentric frusto-conical radially inner annular rim surface 44. The motor rotor 18 may include a complementary frusto-conical annular projection surface 46 disposed on a concentric projection or beveled circumferential surface that extends integrally outboard from the motor rotor housing 16 and that is engageable with the frusto-conical annular inner rim surface 44 of the road wheel 14 when the road wheel 14 is mounted onto the motor rotor housing 16. This arrangement allows the road wheel 14 to be easily mounted to and removed from the motor rotor housing 16 and to positively and concentrically locate the road wheel 14 on the motor rotor 18. In other words, the mating frusto-conical elements 44, 46 position the road wheel 14 in concentricity with the motor 12 while providing for ease of removal. Removal is eased because a suitably designed beveled interface readily releases for dismounting purposes without the binding and/or freeze-up effects associated with square shoulder designs. Such freeze-up effects may result from such factors as mechanical interference and/or corrosion and increase proportionally with the diameter of the interface. In addition, the use of frusto-conical surfaces yields a far more precise centering accuracy than a square-shoulder interface configuration since the square-shoulder interface requires a degree of clearance between interfacing surfaces to facilitate mounting and dismounting of the road wheel 14. In contrast, the frusto-conical interface configuration provides net, zeroed fitment time after time. The beveled wheel/pilot shoulder interface does not need to be of a continuous nature and, in other embodiments, may be divided into segments, spokes, branches or any other suitable manner. In addition, the radially inner annular rim surface 44 and complementary motor rotor housing 16 surface may have any other shape, other than purely frustoconical, suitable to urge the road wheel 14 into a concentric position with respect to the motor rotor 18 while providing for ease of removal of the road wheel 14 from the motor rotor 18. For example, the radially inner annular rim surface 44 and complementary motor rotor housing surface 46 may be arcuate as viewed in a cross-section of the wheel and/or motor rotor 18 taken along a rotational axis of the road wheel 14 and/or motor rotor 18.

Figure 8:
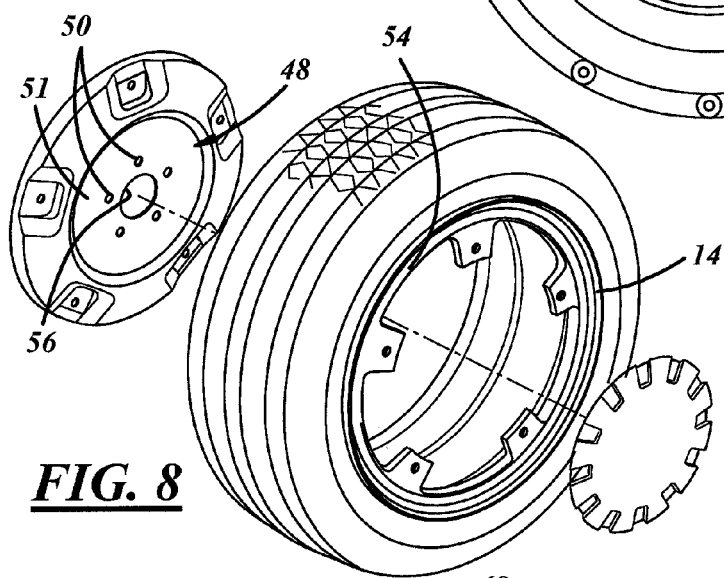
FIG. 8 is an outside orthogonal view of a virtual wheel center constructed according to the invention shown dismounted from a hubless road wheel and with a hub cap removed.

As shown in FIG. 8, the apparatus 10 may also include a virtual wheel center 48 that is removably and concentrically connectable to the road wheel 14. The virtual wheel center 48 may include mounting lugholes 50 positioned in a central hub region 51 of the wheel center 48 to receive mounting bolt shafts extending axially outboard from a wheel-mounting spindle. Joined together, the hub-less road wheel 14 and the virtual wheel center 48 effectively form a "virtual" conventional wheel that incorporates wheel mounting lug hole features and thus effectively enables the fitment of the hub-less road wheel 14 to a non-driven axle and thus to enable the use of the same type of hub-less wheel on all wheel positions of a given vehicle, whether or not those wheel positions are fitted with an in-wheel motor 12. In other words, the road wheel 14 attaches to the "virtual" wheel center 48 in the same manner as the road wheel 14 attaches to the motor rotor housing 16. A further tire maintenance benefit of this approach is that the wheels may be rotated amongst the different wheel positions, as is recommended practice for most automobiles and road vehicles, to equalize tire wear and maximize useful tire service life.

The virtual wheel center 48 may also comprise an axially disposed wheel pilot bore 56 positioned to receive a spindle of a wheel mount of conventional wheel and/or tire servicing or balancing equipment and to allow the road wheel 14 to be supported on such existing conventional servicing equipment for wheel and/or tire servicing and/or tire replacement. In this configuration the virtual wheel center 48 allows routine service and/or repair to be performed on the tire or road wheel 14 at any facility currently equipped to handle conventional tire repair/replacement functions. Where a vehicle includes a hub-less road wheel 14 that is non-driven and that does not include an in-wheel motor 12, the virtual wheel center 48 may take the place of the in-wheel motor 12 as a means of mounting the hub-less road wheel 14 on the vehicle. This would enable the servicing of the hub-less road wheel 14 in a conventional manner. Likewise, a spare tire/virtual wheel center combination would allow the field replacement of any of a vehicle's wheels/tires and would allow an operator to address, roadside, a malfunction such as a flat, in essentially a conventional manner.

Figure 9:
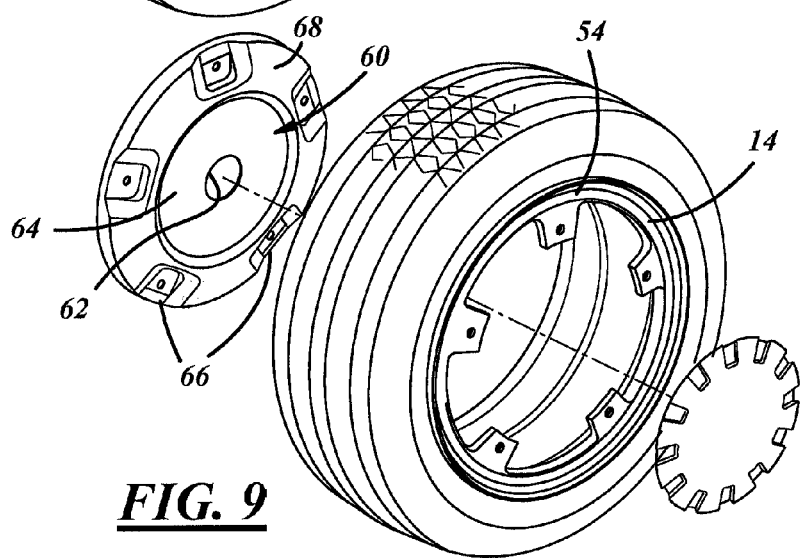
FIG. 9 is a service wheel center constructed according to the invention shown dismounted from a hubless road wheel and with a hub cap removed.

As shown in FIG. 9, the apparatus 10 may also include a service wheel center 60 that, like the virtual wheel center 48, is removably and concentrically connectable to the road wheel 14 and includes an axially disposed wheel pilot bore 62 positioned in a central hub region 64 to receive a spindle of a wheel mount of conventional wheel and/or tire servicing or balancing equipment and to allow the road wheel 14 to be supported on such equipment for wheel and/or tire servicing and/or tire replacement. Unlike the virtual wheel center, however, and as shown in FIG. 9, the service wheel center 60 need not include wheel lugholes. The service wheel center 60 allows routine service and/or repair to be performed on the tire or road wheel 14 at any facility currently equipped with conventional wheel servicing equipment for performing conventional tire repair/replacement functions. The service wheel center 60 can be installed on a hub-less road wheel 14 to perform service operations on the road wheel 14 and/or tire and then removed and stowed in the vehicle following completion of the required tasks. The service wheel center 60 may also be removably and concentrically connectable to an emergency replacement wheel such as a conventional spare wheel, a mini high pressure spare wheel, a wheel supporting an inflatable spare tire, other emergency wheel devises or a run-flat wheel and tire assembly. Accordingly, the service wheel center 60 may include mounting lug holes 70 positioned to receive mounting fasteners extending axially outboard from a standard vehicle wheel mounting spindle, so that the emergency wheel can be mounted and run on a vehicle.

The apparatus 10 may include an inner rotating shield 72 carried by the motor rotor housing 16. The inner rotating shield 72 may have an outer rim 74 carried by and sealed against an axially inboard radially outer rim of the motor rotor housing 16. The inner rotating shield 72 may also include a bearing seal 76 carried by a radially inner rim or annulus of the shield 72. The inner bearing seal 76 may be positioned to bear and seal against a stationary vehicle component such as a knuckle 22 and/or against the circumferential flange of the spindle hub 28 of the apparatus 10. This positively positions the inner rotating shield 72 and provides a functional rotational seal against outside contaminants. In other words, the inner rotating shield 72 seals against the hub 28 in such a way as to form, along with the motor rotor housing 16, spindle 26, and hub 28, the generally toroidally-shaped motor chamber 40, which rotates around and seals-off interior components of the motor 12 such as the motor stator 20.

The inner rotating shield 72 may thus be shaped and arranged to complete the motor chamber 40—to fully enclose and seal-off inner components of the motor 12. An O-ring seal or other suitable seal may be disposed between the outer rim of the inner rotating shield 72 and the motor rotor housing 16 to provide an environmentally tight junction with the motor rotor housing 16. The inner rotating shield 72 may also be contoured to follow the general contour of the stator windings support frame 30 while being positioned to provide adequate clearance from the stator windings support frame 30. The inner rotating shield 72, in addition to serving a closure and sealing function, may also add structural support for an axially inboard portion of the motor rotor 18.

The disk braking system 24 may include a caliper 80 mountable on the vehicle in a position axially inboard of the motor rotor housing 16. The annular disk brake rotor 36 may be carried coaxially by the motor rotor 18 in a peripheral position axially inboard from and concentric with the stator windings 32 and in a position to be received by the caliper 80 when the electric drive motor 12 and the caliper 80 are mounted on a vehicle. Among other things, this arrangement enables the installation of brake rotors having significantly larger diameters, resulting in improved system mechanical advantage and efficiency. This arrangement also provides as short a torque path as possible between the brake 24 and the road wheel 14, enabling the system to have an inherently lower mass design. The brake's torque path is the path by which retarding torque must travel from the point the torque is being generated to the point where the torque is being applied. A short torque path inherently translates into an efficient, lightweight design because a short torque path minimizes the quantity of material required to transfer the retarding torque generated by a disk brake from the brake to a wheel/tire interface. The mechanical advantage associated with the large diameter rotor 36 also further increases the system efficiency and thus enables a further reduction in the overall mass.

The positioning of the disk braking system 24 in a peripheral position axially inboard from and concentric with the stator windings 32 also places the disk brake rotor 36 in an unshrouded, well ventilated area, enabling the prompt dissipation of thermal loads without them impinging upon, or be transferred to the In-Wheel Motor 12. The efficient cooling of the disk brake system 24 also entails potential weight savings due to lower overall disk brake mass requirements.

The disk brake rotor 36 may be attached to the motor rotor housing 16 via peripheral mountings 82. More specifically, the disk brake rotor 36 may be supported on the motor rotor housing 16 by a plurality of radially non-constraining mounts 82 spaced circumferentially around a periphery of the disk brake rotor 36 in such a way as to allow relative radial motion and constrain relative rotational motion between the disk brake rotor 36 and the motor rotor housing 16. This provides a "floating" interface between the motor rotor housing 16 and the disk brake rotor 36 so as to uncouple the transmission of vibrations from the disk braking system 24 onto the motor rotor 18—vibrations that can be generated at the interface of the annular disk brake rotor 36 and brake caliper 80 of the braking system 24. The non-constraining mounts 82 also accommodate the expansion and contraction of the disk brake rotor 36 that occurs due to the periodic generation of applied thermal loads. Each non-constraining mount 82 of the plurality of mounts includes a motor rotor post 84 extending axially inboard from the motor rotor housing 16 and a brake rotor mating recess 86 formed radially inwardly from a peripheral outer edge of the disk brake rotor 36, each such recess 86 being positioned and shaped to receive and engage one of the motor rotor posts 84.

The inner chamber 40 or cavity of the motor 12 may be filled with an inert gas such as Nitrogen. The use of an inert gas insures that the gas will not react with motor stator components, which might otherwise result in damage in the form of degradation or corrosion of the motor stator components. Nitrogen, being readily available, is a desirable inert gas option but other suitable gases may be used as well. The inert gas may be pressurized to a value greater than ambient air pressure to establish a positive pressure environment within the cavity. Maintaining a positive-pressure environment will further resist the intrusion of contaminants into the motor housing 16. A gas pressure sensor 90 may be disposed in a position within the motor 12 stator cavity to sense gas pressure within the motor 12 stator cavity so that the sealing integrity of the motor 12 stator cavity may be monitored. Sensors of a type capable of monitoring the gas pressure in the motor 12 stator cavities are readily available and of low cost. The sensor 90 may be connected to an indicator 92 such as a maintenance requirement-warning indicator positioned to notify a vehicle operator when the sensor detects a reduction in gas pressure within the motor 12 stator cavity. Alternatively, or in addition, the sensor 90 may be connected and provide a corresponding indication to an on board vehicle diagnostics system 93 when the sensor detects a reduction in gas pressure within the motor chamber 40. The seal state of the motor chamber 40 of each wheel can thus be individually monitored and diagnosed.

Figure 11:
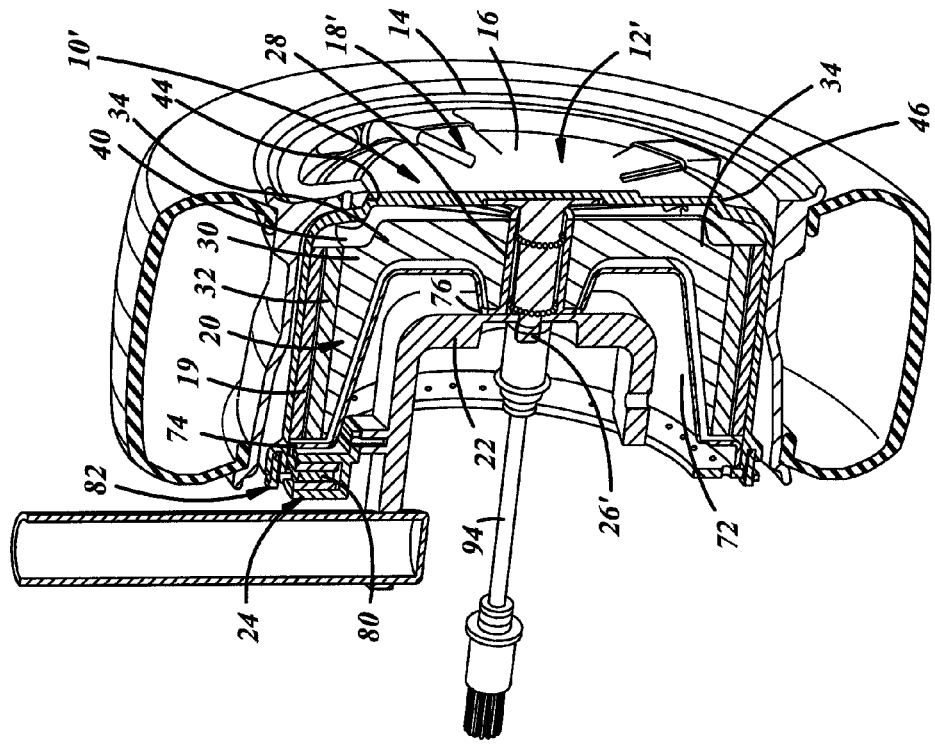
FIG. 11 is a front cross-sectional orthogonal view of the tire, road wheel propulsion apparatus, knuckle, and mechanical drive component of FIG. 10.
Figure 10:
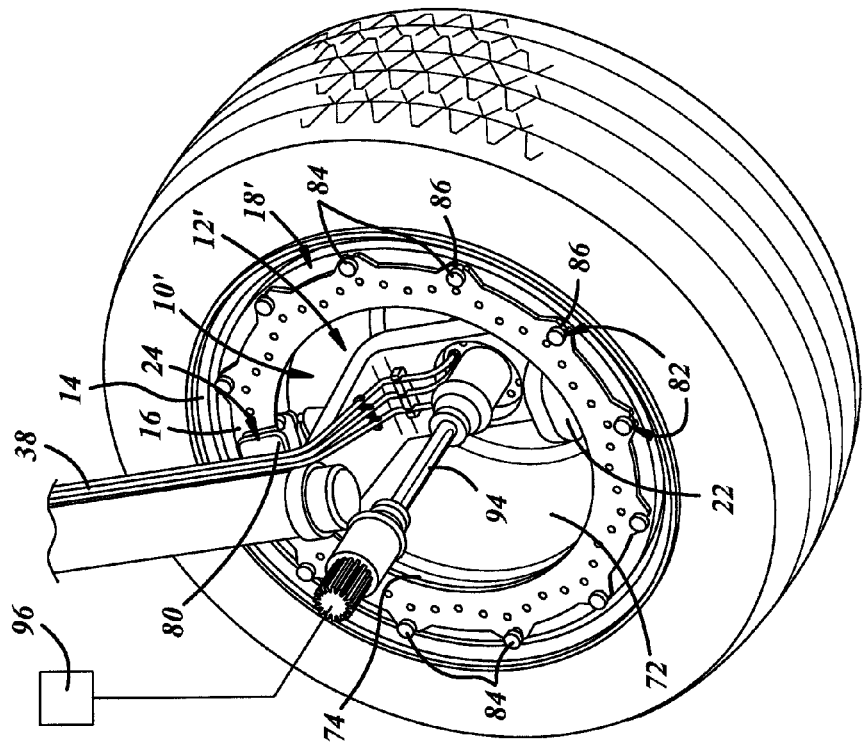
FIG. 10 is an inside orthogonal view of a tire mounted on a road wheel propulsion apparatus constructed according to a second embodiment of the invention, mounted on a knuckle of an automotive vehicle, and also showing a mechanical drive component connected to a spindle of an electric motor rotor of the road wheel propulsion apparatus.

According to a second embodiment of the invention shown in FIGS. 10 and 11, the spindle 26 may be connected to the wheel 14 and drivably connected to a mechanical drive component 94 such as a half-shaft of a mechanical drive train carried by the vehicle so as to allow driving torque to be transmitted from an engine of the mechanical drive train to the road wheel 14. This allows the vehicle to operate as a parallel hybrid in which motive power is transmitted to a drive wheel 14 both from the electric motor 12 in the road wheel 14 and from an internal combustion engine carried by the vehicle.

To allow the vehicle to operate alternatively via either electric or internal combustion power, a coupling/decoupling mechanism 96 may also be included in the drive train, e.g., in a transmission of the drive train, to allow selective coupling and decoupling of the mechanical drive train relative to the drive wheel 14. Decoupled, the vehicle may be operated purely electrically with the internal combustion engine shut-off or disconnected. Alternatively the engine may be energized to drive a generator that supplies electrical power to the electric motor 12 either directly or through storage media such as batteries. Such motive power would thus be deliverable to the drive wheel 14 from both sources at the same time or alternately depending on such factors as driving conditions, torque requirements, and the availability of stored electrical power.

Accordingly, a hybrid drivetrain can be provided in a conventional vehicle simply by mounting on the vehicle in-wheel electric drive motors 12 constructed according to the invention. In other words, the support spindle 26 of an in-wheel electric drive motor 12 constructed according to the invention is like that of a conventional front wheel drive vehicle and possesses all the inherent compatabilities of such a structure.

In-wheel motors 12 constructed according to the invention can, therefore, be connected to a mechanical transmission by simply modifying an inner attachment of the spindle 26 and incorporating a mechanical link 94 to a drive shaft. Such modifications would be within standard automotive practice. The obvious benefit of this approach is the ability to create a flexible parallel hybrid architecture allowing a vehicle to be driven by electric in-wheel motors 12, directly through a mechanical linkage from an internal combustion engine, or both at the same time, without the need for extensive modifications to existing transmissions, such as on conventional parallel hybrid drivetrains.

Multiple engine/transmission combinations, currently offered as standard vehicle options, could be readily hybridized by incorporating in-wheel motors 12 constructed according to the invention—a much simpler engineering task than incorporating an electric motor into each and every transmission type being produced. Another benefit is the ability to pair a much smaller engine type with in-wheel motors 12 constructed according to the invention, resulting in weight reduction, cost reduction, and significant reductions in the amount of fuel required to travel a given distance. Yet another benefit of this approach is that the electric motor-related components of the drive system, other than batteries and electronic controls, don't take up any internal vehicle volume.

The process of constructing the road wheel propulsion apparatus 10 may include designing and constructing the motor rotor 18 to maximize its axial length and minimize its radial thickness such that an axially outboard wall of the motor rotor housing 16 is disposed as far axially outboard and an axially inboard wall of the housing is disposed as far axially inboard as practicable and/or necessary to reduce the radial thickness of the rotor and stator windings or permanent magnets 19, 32 as required to provide sufficient internal volume to house other components. In other words, rotor windings or a drum-shaped permanent magnet 19 of the motor rotor 18 and stator windings or a drum-shaped permanent magnet 32 of the motor stator may be constructed to extend axially to an extent practicable and necessary to achieve desired objectives for a given application, e.g., to maximize the internal volume available for motor components, both in terms of diameter as well as width, and in turn deliver the highest system efficiency possible within the constraints imposed by the specific vehicle parameters selected.

The stator windings support frame 30 may then be formed and the hub 28 insert molded onto the stator windings support frame 30 such that the stator windings support frame is over molded around the spindle hub 28. More specifically, the support frame 30 may be cast around the hub 28 to insure that the support frame is precisely concentrically formed about a rotational axis of the hub 28. This procedure forms a composite component that provides solid, lightweight structural support for the motor's stator windings 32 as well as the structural requirements necessary to cope with wheel/motor 12 bearing loads. The stator windings support frame 30 is then supported for relative rotation within the motor rotor 18, and the motor rotor 18 is supported concentrically within a hub-less road wheel 14. Where the motor rotor 18 has been cast around the spindle 26, the enhanced concentricity of both components will more precisely maintain desired tolerances between them. In other embodiments the stator windings support frame 30 may be formed by a combination of technologies such as part casting and spin-forming, combining elements of both manufacturing techniques.

A road wheel propulsion apparatus 10 constructed according to the invention is able to alternately propel and retard the rotation of a vehicle road wheel 14 while providing a much shorter torque path than would otherwise be possible, which allows for a more efficient, lightweight design by minimizing the quantity of material required to transfer the driving/retarding torques generated by the motor 12 and/or the brake. The positioning of the disk brake caliper 80 and rotor 36 axially inboard of the electric motor rotor 18 with the brake rotor 36 being carried by the electric motor rotor 18, allows for a larger diameter brake rotor 36 and improves brake rotor cooling by un-shrouding the brake rotor 36 from the road wheel 14. Arranging the motor rotor 18 to carry the road wheel 14 allows the road wheel 14 to be removed without removing the motor rotor 18, since the motor rotor 18 is carried by the spindle 26 and doesn't need a wheel hub 28 to mechanically support itself for rotation. This arrangement also allows for the use of a hubless road wheel 14 since the motor rotor housing 16 is shaped to support the motor rotor 18 on the spindle 26 without relying on a wheel hub 28. The scalloping of the stator windings support frame 30 provides sufficient structural strength to maximize the axial distance over which the stator windings 32 can extend while at the same time narrowing sufficiently in the hub region to provide static and dynamic clearance for suspension and steering components. The motor chamber 40 encloses and protects the stator windings 32 and other internal motor 12 components and allows for further protection against contamination via inert gas pressurization. Because the hub 28 defines a non-rotating pathway between the motor stator 20 and knuckle 22, it allows for the passage of electricity, matter, electrical wiring, an electrical wiring conduit, a coolant fluid, a coolant gas, an inert gas, a coolant conduit, and an inert gas conduit, etc. The shape of the annular wheel and motor 12 rotor engagement surfaces act to removably urge the road wheel 14 toward concentricity in relation to the motor rotor 18 as the road wheel 14 is mounted on the motor rotor 18. The virtual wheel center allows the hubless road wheel 14 to be mounted at points on a vehicle where there's no in-wheel motor 12 mounted. The service wheel center 60 allows the hubless road wheel 14 to be serviced on existing wheel servicing centers. The inner rotating motor 12 rotor shield 72 seals the motor 12 against contaminants, preventing contaminants from entering the space between the rotor and stator windings 32, and adds support for an inner portion of the motor rotor 18. Drivably connecting the spindle 26 to a mechanical drive component of a mechanical drive train carried by the vehicle allows for parallel hybrid operation by allowing driving torque to be transmitted from an engine of the mechanical drive train through the motor rotor 18 to the road wheel 14.

This description, rather than describing limitations of an invention, only illustrates (an) embodiment(s) of the invention recited in the claims. The language of this description is therefore exclusively descriptive and is non-limiting. Obviously, it's possible to modify this invention from what the description teaches. One may practice the invention other than as described above.

I claim:

1. A road wheel propulsion apparatus for alternately propelling and retarding the rotation of a road wheel supporting an automotive vehicle; the apparatus comprising:
   a hub configured to be fixed to a vehicle component;
   a spindle received within the hub and supported by the hub for rotation relative to the hub and the vehicle;
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle and including an annular motor stator windings support frame that is carried by the hub and that carries stator windings of the motor stator; and
      a radially outer annular motor rotor configured to be carried by the spindle concentrically within a road wheel and to be driven in rotation relative to the motor stator by electromagnetic forces developed between the motor stator and the motor rotor.

2. The apparatus of claim 1 in which the stator windings support frame includes a radially oriented array of scallops configured to provide clearance for vehicle components while supporting stator windings of axial width greater than an axial length of the hub.

3. The apparatus of claim 2 in which:
   the array of scallops is supported within a stator winding support drum such that each scallop of the array is connected at a radially outer end to the drum and at a radially inner end to the hub; and
   the array of scallops is shaped to provide clearance for vehicle components while supporting stator windings of axial width greater than an axial length of the hub.

4. The apparatus of claim 3 in which the scallops of the array of scallops are shaped to be more axially extensive where their respective outer ends connect to the drum and less axially extensive where their respective inner ends connect to the hub.

5. The apparatus of claim 1 in which the motor includes a motor chamber that at least partially encloses the stator windings.

6. The apparatus of claim 5 in which the hub at least partially defines a non-rotating pathway between the motor chamber and a vehicle carrying the apparatus, the pathway being configured to allow for the passage of any one or more of a number of different things selected from the group consisting of electricity, matter, electrical wiring, an electrical wiring conduit, a coolant fluid, a coolant gas, an inert gas, a coolant conduit, or an inert gas conduit.

7. The apparatus of claim 6 in which the radially inner annular rim surface of the hubless road wheel and the annular projection surface of the motor rotor are each generally frustoconical in shape.

8. The apparatus of claim 5 in which the apparatus includes a fluid passageway extending through the hub and configured to provide fluid communication between the motor chamber and an ambient air mass.

9. The apparatus of claim 5 in which an inert gas occupies the motor chamber.

10. The apparatus of claim 9 in which the inert gas is Nitrogen.

11. The apparatus of claim 9 in which the inert gas in the motor chamber is pressurized to a value greater than ambient air pressure.

12. The apparatus of claim 5 in which the apparatus includes a remote inert gas reservoir and a fluid passageway configured to provide fluid communication between the motor chamber and the remote inert gas reservoir.

13. The apparatus of claim 12 in which the sensor is configured to provide a corresponding indication to a vehicle operator when the sensor detects a reduction in gas pressure within the motor chamber.

14. The apparatus of claim 12 in which the sensor is configured to provide a corresponding indication to an on board vehicle diagnostics system when the sensor detects a reduction in gas pressure within the motor chamber.

15. The apparatus of claim 9 in which the apparatus includes a gas pressure sensor disposed in a position to sense gas pressure within the motor chamber.

16. A road wheel propulsion apparatus for alternately propelling and retarding the rotation of a road wheel supporting an automotive vehicle; the apparatus comprising:
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle; and
      a radially outer annular motor rotor configured to be carried within a road wheel and to be driven in rotation relative to the motor stator by electromagnetic forces developed by between the motor stator and the motor rotor, the motor rotor being configured to carry a hubless road wheel; the apparatus further comprising:
   a hub that carries the motor stator and is configured to removably mount to any one or more vehicle components selected from the group of components consisting of a steering knuckle, a suspension hub carrier, or a suspension axle; and
   a spindle that carries the motor rotor and is received within the hub and is supported by the hub for rotation relative to the hub.

17. A road wheel propulsion apparatus for alternately propelling and retarding the rotation of a road wheel supporting an automotive vehicle; the apparatus comprising:
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle; and
      a radially outer annular motor rotor configured to be carried within a road wheel and to be driven in rotation relative to the motor stator by electromagnetic forces developed by between the motor stator and the motor rotor; the apparatus further comprising:
   a hubless road wheel configured to be removably mounted on the motor rotor and having a radially inner annular rim surface;
   a hub that carries the motor stator and is configured to mount to a vehicle component; and
   a spindle that carries the motor rotor and is received within the hub and supported by the hub for rotation relative to the hub; the motor rotor including:
   a motor rotor housing carried by the spindle and configured to carry a hubless wheel; and
   a complementary annular projection surface on a concentric projection extending outboard from the motor rotor housing, the annular projection surface of the motor rotor housing being configured to engage the annular inner rim surface of the hubless road wheel when the wheel is mounted onto the motor rotor housing, the respective annular surfaces being shaped to removably urge the wheel toward concentricity in relation to the motor rotor as the wheel is mounted on the motor rotor.

18. A road wheel propulsion apparatus for alternately propelling and retarding the rotation of a road wheel supporting an automotive vehicle; the apparatus comprising:
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle; and
      a radially outer annular motor rotor configured to be carried within a road wheel and to be driven in rotation relative to the motor stator by electromagnetic forces developed by between the motor stator and the motor rotor, the motor rotor being configured to carry a hubless road wheel; the apparatus further comprising:
   a hubless road wheel configured to be removably mounted on the motor rotor; and
   a virtual wheel center configured to be removably and concentrically connected to the hubless road wheel and to removably mount the hubless road wheel on a standard vehicle wheel mounting flange.

19. The apparatus of claim 18 in which the service wheel center comprises mounting lug holes positioned to receive mounting fasteners configured to mount the service wheel center to a standard vehicle wheel mounting flange.

20. A road wheel propulsion apparatus for alternately propelling and retarding the rotation of a road wheel supporting an automotive vehicle; the apparatus comprising:
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle; and
      a radially outer annular motor rotor configured to be carried within a road wheel and to be driven in rotation relative to the motor stator by electromagnetic forces developed by between the motor stator and the motor rotor, the motor rotor being configured to carry a hubless road wheel; the apparatus further comprising:
   a hubless road wheel configured to be removably mounted on the motor rotor; and
   a service wheel center configured to be removably and concentrically connected to the wheel and to removably mount the wheel on conventional wheel servicing equipment, the service wheel center further comprising an axially disposed wheel pilot bore configured to be received on a spindle of a wheel mount of conventional servicing equipment.

21. A road wheel propulsion apparatus for alternately propelling and retarding the rotation of a road wheel supporting an automotive vehicle; the apparatus comprising:
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle; and
      a radially outer annular motor rotor configured to be carried within a road wheel and to be driven in rotation relative to the motor stator by electromagnetic forces developed by between the motor stator and the motor rotor, the motor rotor being configured to carry a hubless road wheel; the apparatus further comprising:
   a hub that carries the motor stator and is configured to mount to a vehicle component;
   a spindle that carries the motor rotor and is received within the hub and supported by the hub for rotation relative to the hub; and
   an inner rotating shield carried by the motor rotor, the inner rotating shield having a radially outer rim carried by and sealed against the motor rotor and a bearing seal carried by a radially inner rim of the shield positioned to bear and seal against one of a stationary vehicle component and the hub.

22. The apparatus of claim 21 in which the inner rotating shield is configured to provide structural support for an inboard portion of the motor rotor.

23. A road wheel propulsion apparatus for alternately propelling and retarding the rotation of a road wheel supporting an automotive vehicle; the apparatus comprising:
   a hub configured to be fixed to a vehicle component;
   an electric drive motor configured to be carried by a vehicle and drivingly connected to a road wheel to provide motive force to the vehicle by driving the road wheel in rotation relative to the vehicle, the electric drive motor comprising:
      a radially inner motor stator configured to be fixed to the vehicle and including an annular motor stator windings support frame that is carried by the hub and that carries stator windings of the motor stator; and
      a radially outer annular motor rotor configured to be carried by the spindle concentrically within a road wheel and to be driven in rotation relative to the motor stator by electromagnetic forces developed between the motor stator and the motor rotor; and
   a disk braking system supported adjacent the electric drive motor and actuable to retard wheel rotational velocity relative to the vehicle, the disk braking system including:
      a caliper configured to be carried by the vehicle in a position axially inboard of the stator windings; and
      an annular disk brake rotor carried coaxially by the motor rotor in a position extending radially inward from the motor rotor such that an inner circumferential edge region of the brake rotor is received by the caliper when the electric drive motor and the caliper are mounted on the vehicle.

24. The apparatus of claim 23 in which the disk brake rotor is supported on the motor rotor by a plurality of mounts spaced circumferentially around a periphery of the disk brake rotor and configured to allow relative radial motion while constraining relative rotational motion between the disk brake rotor and the motor rotor.

25. The apparatus of claim 23 in which each mount of the plurality of mounts includes:
   a motor rotor post extending axially inboard from the motor rotor; and
   a brake rotor mating recess formed radially inwardly from a peripheral outer edge of the disk brake rotor, each such recess being positioned and shaped to receive and loosely engage one of the motor rotor posts.

26. A road wheel propulsion apparatus as set forth in claim 23 in which the annular disk brake rotor is carried by the motor rotor in a position where the rotor is disposed axially inboard of a road wheel carried by the motor rotor.

27. A road wheel propulsion apparatus as set forth in claim 26 in which the annular disk brake rotor is carried by the motor rotor in a position where the rotor is disposed axially inboard of an axially inner surface of an axially inner rim of the road wheel carried by the motor rotor.

28. A road wheel propulsion apparatus for alternately propelling and retarding the rotation of a road wheel supporting an automotive vehicle; the apparatus comprising:
    an electric drive motor configured to be carried by a vehicle and drivingly connected to a road wheel to provide motive force to the vehicle by driving the road wheel in rotation relative to the vehicle, the electric drive motor comprising:
        a radially inner motor stator configured to be fixed to the vehicle; and
        a radially outer annular motor rotor configured to be carried within a road wheel and to be driven in rotation relative to the motor stator by electromagnetic forces developed between the motor stator and the motor rotor, the motor rotor being configured to carry a hubless road wheel; the apparatus further comprising:
    a hub that carries the motor stator and is configured to mount to a vehicle component; and
    a spindle that carries the motor rotor and is received within the hub and supported by the hub for rotation relative to the hub, the spindle being configured to be drivably connectable to a mechanical drive component of a mechanical drive train carried by the vehicle and to transmit driving torque from an engine of the mechanical drive train through the motor rotor to the wheel.

29. A method for assembling and mounting a road wheel propulsion apparatus on a vehicle, the method comprising the steps of:
    supporting a hub of a road wheel propulsion apparatus on a component of a vehicle; and
    supporting an electric drive motor of the apparatus on the vehicle by:
        supporting a radially inner motor stator of the electric drive motor on the hub:
        supporting a radially outer annular motor rotor of the electric drive motor on a spindle of the apparatus;
        supporting the spindle at least partially within the hub for rotation relative to the hub with the motor stator disposed concentrically within the motor rotor; and
    supporting a hubless wheel on the motor rotor.

30. The method of claim 29 including the additional step of fabricating the motor rotor housing a spin-formed forging process.

31. The method of either of claim 29 or 30 including the additional steps of:
    mounting the motor stator to a vehicle suspension; and
    molding the hub onto a motor stator windings support frame using a spin-formed forging process.

32. A road wheel propulsion apparatus for alternately propelling and retarding the rotation of a road wheel supporting an automotive vehicle; the apparatus comprising:
    a hub configured to be fixed to a vehicle component;
    an electric drive motor configured to be carried by a vehicle, to carry a road wheel, and to provide motive force to the vehicle by driving the road wheel in rotation relative to the vehicle, the electric drive motor comprising:
        a radially inner motor stator configured to be fixed to the vehicle; and
        a radially outer annular motor rotor configured to be concentrically disposed within and to carry a road wheel and to be driven in rotation relative to the motor stator by electromagnetic forces developed between the motor stator and the motor rotor; and
    a disk braking system supported adjacent the electric drive motor and actuable to retard motor rotor and wheel rotational velocity relative to the vehicle, the disk braking system including:
        a caliper configured to be carried by the vehicle; and
        an annular disk brake rotor carried coaxially by the motor rotor in a position where the rotor is disposed axially inboard of a road wheel carried by the motor rotor.

33. A road wheel propulsion apparatus as set forth in claim 32 in which the disk brake rotor extends radially inward from the motor rotor such that an inner circumferential edge region of disk the brake rotor is received by the caliper when the electric drive motor and the caliper are mounted on the vehicle.

34. A road wheel propulsion apparatus as set forth in claim 32 in which the annular disk brake rotor is carried by the motor rotor in a position where the rotor is disposed axially inboard of an axially inner surface of an axially inner rim of a road wheel carried by the motor rotor.

\* \* \* \* \*